US011976488B1

(12) United States Patent
Hunt

(10) Patent No.: US 11,976,488 B1
(45) Date of Patent: May 7, 2024

(54) METHOD AND APPARATUS FOR FENCE ADVERTISEMENT

(71) Applicant: Laura Amelia Guerra-Hunt

(72) Inventor: Randall Clay Hunt, Corpus Christi, TX (US)

( * ) Notice: Subject to any disclaimer, the term of this patent is extended or adjusted under 35 U.S.C. 154(b) by 0 days.

(21) Appl. No.: 17/828,961

(22) Filed: May 31, 2022

(51) Int. Cl.
*G09F 7/02* (2006.01)
*E04H 17/06* (2006.01)
*G09F 7/18* (2006.01)

(52) U.S. Cl.
CPC ............... *E04H 17/06* (2013.01); *G09F 7/02* (2013.01); *G09F 7/18* (2013.01)

(58) Field of Classification Search
CPC .............. E04H 17/06; G09F 7/02; G09F 7/18
USPC ................................................ 256/1, 32, 33
See application file for complete search history.

(56) References Cited

U.S. PATENT DOCUMENTS 1,064,897 A * 6/1913 Gabet ..................... G09F 13/16 40/583
2,417,615 A * 3/1947 Rothe .................... A63B 67/00 273/340
4,842,230 A * 6/1989 Cobb ...................... A47F 5/083 248/302
5,275,381 A * 1/1994 Cluff ..................... E04H 17/066 24/336
5,959,255 A * 9/1999 Langlie ................ H01B 17/145 256/10
6,708,955 B2 * 3/2004 Cummings ........... E04H 17/164 256/19
7,076,898 B1 * 7/2006 Hunt ......................... G09F 7/02 256/33
D537,954 S * 3/2007 Leone .......................... D25/38.1
8,322,667 B2 * 12/2012 Zannoni ................ E04H 17/066 248/311.2
9,069,433 B2 6/2015 Hunt
2005/0274937 A1 * 12/2005 Moore .................. E04H 17/066 256/1

FOREIGN PATENT DOCUMENTS

AU 74553/94 3/1995
NL 1002522 C2 * 9/1997 ............. E04H 17/02

OTHER PUBLICATIONS https://www.youtube.com/watch?v=L6ZrjVJy02Y Video showing cups placed on fence by Romeoville HS students; Sep. 12, 2018. At this point, the cups were still in research and development phase.
(Continued)

*Primary Examiner* — Cassandra Davis
(74) *Attorney, Agent, or Firm* — M. Susan Spiering; Dehoa & Associates, P.C.

(57) ABSTRACT

Disclosed herein is an improved device for insertion in a fence hole of a chain-link fence wherein the improvement comprises a locking tab which allows for a snap-on or clip like member to secure the device to the wires of the chain link fence. The invention comprises an integral four-sided cup able to fit, snap, and stay secure within the holes of chain link fences. The locking tabs comprise a C-shaped design extending out and downward from the lower lip or top edge of the cup and allow the cup to snap on the fence wires. It has been found that once properly secured on the fence wires, the cups can withstand winds greater than 100 mph, in-tact, and remaining secured in the fence hole.

10 Claims, 8 Drawing Sheets

(56) References Cited

OTHER PUBLICATIONS https://www.putincups.com Video had been placed on applicant's website for research and development purposes, and feedback requested. May 12, 2020. Currently, the video is off the website.

* cited by examiner

METHOD AND APPARATUS FOR FENCE ADVERTISEMENT

FIELD OF THE INVENTION

The present invention relates to devices that are utilized to place text, advertisements and/or decorative elements on chain-link fences. More particularly, the present invention relates to cups that are inserted in fence holes of chain-link fences to place texts, advertisements, or decorative elements thereon.

DESCRIPTION OF THE RELATED ART

Advertising is a crucial aspect of any commercial business. For businesses, for example, motels, restaurants, cleaning services, coaching services, clubs, or the like, signage located at the place of business is the most effective form of advertisement. Conventionally, such businesses use billboards, hoardings, or the like for advertising themselves. However, costs, zoning and other regulatory restrictions, such as restrictive covenants and air and light easements, may make the use of billboards difficult or impossible for some businesses. Many businesses have fences which surround the property. One common type of fence is a chain-link fence. Hence, utilization of ordinary fences such as chain-link fences for advertisement purposes would avoid zoning and other regulatory restrictions.

U.S. Pat. Nos. 7,076,898, and 9,069,433, incorporated by reference in their entirety, disclose a specialized cup, or device, for insertion in square fence holes of a chain-link fence to place texts, or advertisements. The device is releasably secured to the fence to allow display of text and design components on the fence. The device has a display plate of square shape and a plurality of side plates that extend at an angle from the display plate. Each side plate includes latch members and a lip structure at a distal end thereof. When the device is inserted in a fence hole of the chain-link fence, wires of the chain-link fence get locked between the latch members and the lip structure. However, the device is prone to be easily pushed through the fence hole of the chain-like fence when it is exposed to strong winds or pushed out by children or errant adults wanting to spoil the advertisement. The device falls out from the fence hole easily when exposed to interference from weather, children, or other malicious causes and thereby messes up a design on the fence and also causes littering in the vicinity of the fence due to fallen devices. Generally, undesirable movements include any external force being applied from any direction. These movements can come from individuals poking at the cups, a strong wind which may cause the fence to bend sufficiently to loosen the cups, or banging on the fence by objects (e.g., hands, baseball bats, broom sticks, etc) and hence loosening the hold of the cup (i.e., the device) in the fence hole.

A known solution for preventing the device from falling out of the fence holes is stapling two adjacent cups together using C-staples and pliers to tighten the C-staple around the cup edges. However, this proposed solution is a tedious job for a user to staple the devices to avoid fall out and un-staple the stapled devices to remove the cups from the fence. Another known solution includes protecting the device by way of chicken-wire. The chicken-wire is rolled out and secured or positioned in front and/or back of the chain-link fence and the cups which are in a design or text pattern. The chicken-wire fencing may act as a hinderance, but it also tends to block a clear view of the design, text, or advertisement formed on the chain-link fence.

AU B 74553/94 discloses an attachment for chain link fences, primarily directed towards a decorative device having post-supportive interwoven wires.

U.S. Pat. No. 8,322,667 B2 discloses a holder for attachment to a chain link fence, and is primarily directed to holding beverage containers on the chain link fence.

In light of the foregoing, there exists a need for a technical and reliable solution that overcomes the abovementioned problems, and ensures secure and efficient advertising.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Disclosed herein is an improved device for insertion in at least one square fence hole of a chain-link fence wherein the improvement comprises a snap on or clip like member so as the device remains secured on the wires of the chain link fence. The present invention comprises an integral four-sided cup able to fit into holes of chain link fences, as disclosed in U.S. Pat. No. 7,076,898, wherein the improvement comprises locking tabs on the lower lip members, to secure the cup to the fence hole. The locking tabs comprise a C-shaped design extending out and downward from the lower lip or top edge of the cup and once engaged with the fence wires, securely attach the cup to the fence hole. It has been found that cups with the improved locking tabs attached to fence holes, have withstood hurricane winds greater than 100 mph, preferably greater than 150 mph. in-tact, An embodiment comprises a planar base having first through fourth edges, and a front and back side (also interchangeably called top and bottom respectively). The size of the planar base is less than size of the fence hole. The device (interchangeably called the apparatus or cup) further includes a plurality of side plates extending from the corresponding first through fourth edges of the planar base. Each side plate forms an obtuse angle with the planar base. The apparatus further includes at least one latch member, preferably 2 and most preferably one on each corner for 4 latch members, that extend from the corresponding side plates in a direction away from the center of the planar base and in a plane substantially parallel to the planar base. Each latch member is offset a distance from a center of the corresponding side plate almost to the corner of the apparatus. The apparatus further includes first and second lower lips that extend from distal ends of the corresponding side plates in a plane substantially parallel to the planar base and in a direction away from the planar base. The first and second lower lips are configured to rest onto chain-links corresponding to the edges of the fence hole of the chain-link fence when the apparatus is inserted into the fence hole of the chain-link fence. The apparatus further includes a plurality of locking tabs that extend from distal edges of the first and second lower lips in a direction towards the center of the planar base, and are in a plane substantially perpendicular to the planar base. Each locking tab is configured to snap onto a wire of the fence hole when the apparatus is inserted into the fence hole. The plurality of locking tabs secures the device to the fence hole, and restricts unintended or undesirable movement of the device once it is inserted into the fence hole. Undesirable movement can come from a single force, or multiple forces and in one direction or in multiple directions.

The apparatus may be of various colors and may be inserted to form text, design, and or a pattern on the chain-link fence. The pattern may be formed to place a text or advertisement on the chain-link fence. The disclosed approach for placing the text or advertisement on the chain-link fence is secure, economical, effective, and durable.

BRIEF DESCRIPTION OF THE DRAWINGS

The accompanying drawings illustrate the various embodiments of systems, methods, and other aspects of the invention. It will be apparent to a person skilled in the art that the illustrated element boundaries in the figures represent one example of the boundaries. In some examples, one element may be designed as multiple elements, or multiple elements may be designed as one element. In some examples, an element shown as an internal component of one element may be implemented as an external component in another, and vice versa.

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

FIG. 11 shows a truncated pyramid shape apparatus wherein the locking tabs are directed towards the center of the planar base;

FIG. 12 shows an enlarged view of the locking tabs of FIG. 11;

FIG. 13 shows a top view of an alternate embodiment having a square like shape, of the present invention with inserts or holes for a lighting element;

FIG. 14A shows a top view of an alternate embodiment wherein the apparatus has a square like shape and inserts for lighting element(s);

FIG. 14B shows a bottom view of FIG. 14A with a lighting element inserted in the hole.

Figure 1:
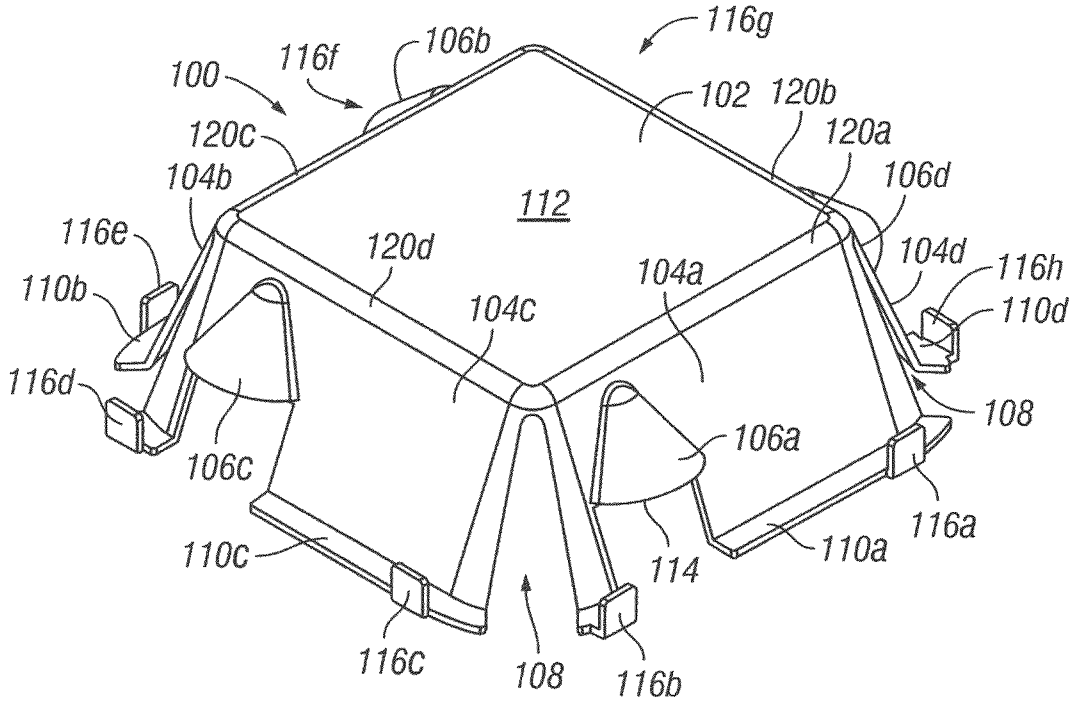
FIG. 1 shows a perspective view of an apparatus for insertion in at least one fence hole of a chain-link fence, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION OF EMBODIMENTS

As used in the specification and claims, the singular forms “a”, “an” and “the” include plural references unless the context clearly dictates otherwise. For example, the term “an article” may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention.

There may be additional components described in the foregoing application that are not depicted on one of the described drawings. In the event, such a component is described, but not depicted in a drawing, the absence of such a drawing should not be considered as an omission of such design from the specification.

Accordingly, the components and the method steps have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Before describing the present invention in detail, it should be noted that the present invention is an improvement over apparatus disclosed in U.S. Pat. Nos. 7,076,898 and 9,069,433 for insertion in chain-link fences, and these patents are incorporated by reference in their entirety. The present invention provides an improvement for existing cups or apparatus to prevent fall off or easy removal of the cups from the fence when exposed to a push or pull force, strong winds and/or, possible banging on the fence by objects. Essentially, the apparatus (also interchangeably called device or cup), together with its locking tabs restricts undesirable or unintentional movement thereof when placed in a chain link fence hole, and the cup is engaged with the wires of the fence. Hence, the apparatus does not fall out of the fence hole due to an unintended or undesired force being applied thereon.

While the device is described relative to a square shape, it is understood that other shapes to match the holes or openings of a chain link or wire fence can be achieved.

The apparatus 100 is preferably made of rigid but pliable material, preferably manufactured with a blow, injection or drop molded method, utilizing 40 mil polyethylene, preferably with PMS colors. The apparatus may also be formed from polypropylene or other suitable materials. It will be appreciated that that the apparatus may be colored, painted, coated, or otherwise treated to produce a wide variety of color effects, transparent coloring, reflective coatings, multiple colorings on different surfaces and polarized treatment. Preferably the materials employed to manufacture the device include ultraviolet light protection to prevent the fading of colors.

Referring to FIGS. 1-4 in the drawings, the device 100 is generally pan or square shaped and includes a surface 102 having a display or top plate 112 and an opposing bottom plate or surface 118, a plurality of side plates 104 *a*-104*d* integrally connected to the top plate 112, a lower lip 110 (*a-d*) that extends at least partially around the periphery of the side plates 104 (*a-d*), preferably at an end opposite the end that is connected to the top plate 112, a latch member 106 (*a-d*) integrally connected to at least one side plate 104, and a locking tab 116 (*a-h*; collectively referred to as "the locking tabs 116") configured to snap onto a wire corresponding to an edge of a fence hole of a chain-link fence. The locking tab 116 is generally C-shaped and extends off the lower lip 110.

In a preferred embodiment, four latch members 106 are provided with one on each side of the apparatus 100, integrally connected thereto allowing the apparatus 100 to be secured to a fence hole relative to all four sides of the cup and four sides of the fence hole. The latch members 106 allow for flexibility of the cup for insertion into the fence hole. In an alternative embodiment, a fewer number of latch members 106 may be employed. For example, having only two latch members may be utilized. In this alternative embodiment, the latch members may be on opposing sides of the apparatus 100 and should provide sufficient support and flexibility to secure the apparatus in place relative to the surrounding portions of the chain link fence hole.

As can be seen in FIGS. 1-4, each latch member 106 protrudes outwards in a ramp fashion with each corresponding side plate 104. Each latch member 106 is preferably flush with each corresponding side plate 104 at a position near the display plate 112, but tapers outwardly a selected distance and terminates with a bottom flange surface 114 that is separated from the lower lip 110 and locking tab 116, and allows the apparatus to be releasably secured to a fence hole. Extending from the lower lip 110 and integrally connected, are locking tab members 116 which engage with the wires of the chain link fence hole. The locking tab 116 forms a C-shape together with the lower lip 110, and engages with the wires of the chain link fence. In a preferred embodiment, at least four locking tab members 116 are provided with one on each side of the apparatus 100, integrally connected to the lower lips 110, and allowing the apparatus 100 to be secured to a fence hole relative to all four sides of the cup and four sides of the fence hole. While the latch members allow for flexibility, the lower lips and locking tabs in unison, allow for a secure fit in the fence hole. In an alternative embodiment, a fewer number of locking tabs 116 may be employed. For example, having only two locking tabs on the cup may be utilized. In this alternative embodiment, the locking tab members 116 may be on opposing sides of the apparatus 100 and should provide sufficient support to secure the apparatus in place relative to the surrounding portions of the chain link fence hole.

The locking tabs 116 essentially snap onto the wires of the fence holding the cup in place within the fence hole. While the cups are resiliently flexible and configured for conforming a resiliently compliant connection with the wires of the chain link fence, the lower lips and locking tabs are relatively rigid to assure their connection with the wires of the fence. Accordingly, the locking tabs, lower lips, and the fence wires, when engaged, are movable only in response to an intended pressure (for example, squeezing the cup for purposeful removal from the fence hole). In its installed position, the lips 110 and locking tabs 116 conform against the wires without any gap therebetween (effectively zero gap), securely holding the cup in place. When several cups are installed next to each other on a chain link fence, placing one cup per hole, the lower lips and locking tabs are offset from the adjacent cup to accommodate the interweaving of the chain link fence and the cups inserted in the respective holes of the fence.

In an alternate embodiment, disclosed herein is an apparatus for insertion in at least one square fence hole of a chain-link fence, the apparatus comprising: a planar base having a front 112 and back 118 side, as well as first through fourth edges 104 (*a-d*), wherein the size of the planar base is less than size of the fence hole; a plurality of side plates extending from the corresponding first through fourth edges of the planar base, wherein each side plate forms an obtuse angle, greater than 90 degrees, with the planar base; latch members 106 that extend from each respective edge of the planar base, in a direction away from a center of the planar base and in a plane substantially parallel to the planar base, and wherein each latch member 106 is at an offset distance from a center of the corresponding side plate; and generally located at about the corner of the base plate; and lower lips 110 (*a-d*), that extend from distal ends of the corresponding side plates 104 (*a-d*), in a plane substantially parallel to the planar base and in a direction away from the planar base, wherein the lower lips are configured to rest onto the chain-links or fence wires corresponding to the edges of the fence hole of the chain-link fence when the apparatus is inserted into the fence hole; and a plurality of locking tabs that extend from distal edges of the lower lips in a direction towards the center of the planar base, and are in a plane substantially perpendicular to the planar base, and wherein each locking tab is configured in a C-shape, to snap onto a wire corresponding to an edge of the fence hole when the apparatus is inserted into the fence hole of the chain-link fence, whereby the plurality of locking tabs 116 (*a-h*) restricts undesired or unintentional movement of the apparatus due to an external force being applied thereon from a single direction.

The locking tabs 116 with the corresponding lower lips 110 and the corresponding side plates 104, allow the cup to fit snuggly within the fence hole. Each locking tab has a rounded tip and the tab fits snugly and tightly over the fence wires. It is understood that the size of the tab 116 is dependent upon the size or gauge of the fence wire and can be manufactured accordingly.

The latch members 106 of the cups have a rounded cross section. The cups may further include a slot 108 between each pair of adjacent side plates and allow for further flexibility of the cup, and wherein the side plates 104 apply a bias against the chain-link fence when the apparatus is inserted into the fence hole of the fence.

During insertion, the wire engages the first and second latch members of the cup, in an interference fit until the wire clears the first and second latch members of the cup and the cup snaps into a secure position in the fence hole. The latch members are distanced from the corresponding lower lips of the cup by a distance that is at least equal to a diameter of a chain-link of the fence.

Optionally, the cups may comprise at least one hole in the planar base adapted in size and shape to receive a light bulb which can be powered by electricity, solar, photo voltaic or other like means. Optionally, the cups may be lit by such means along the latch members or just inside the lip of the cup. The cups may further optionally comprise a light reflective surface disposed on at least one surface of the base. The cups can be various colors which would include sun protective ingredients such as UVA, UVB stabilizers.

In an alternate description, the apparatus 100 is generally pan shaped and includes a display plate 102 (i.e., a planar base) having an upper surface 112 and an opposing bottom surface 118 (shown in FIG. 4), a plurality of side plates 104*a*-104*d* (collectively referred to as "the side plates 104") integrally connected to the display plate 112, a plurality of lower lips 110*a*-110*d* (collectively referred to as "the lower lips 110") that extends at least partially around the periphery of side plates 104, preferably at an end opposite to the end that is connected to display plate 112, and at least one latch member 106 (for example, latch members 106*a*-106*d*) integrally connected to at least one side plate 104.

In a preferred embodiment, four latch members 106*a*-106*d* are provided, with one on each side of the apparatus 100, allowing the apparatus 100 to be secured relative to all four surrounding portions of the chain-link fence. In alternative embodiments, a fewer number of latch members may be utilized. For example, having only two latch members 106*a* and 106*b* on opposing sides of apparatus 100 should provide sufficient support to secure the apparatus 100 in place relative to the surrounding portions of the chain-link fence.

The apparatus 100 further includes a plurality of locking tabs 116*a*-116*h* that extend from distal edges of the lower lips 110 in a direction towards the display plate 102 and in a plane substantially perpendicular to the display plate 102. Each locking tab 116 is configured to snap onto a chain-link or the wires of the fence. The wires correspond to an edge of a square fence hole (i.e., fence opening) of the chain-link fence when the apparatus 100 is inserted into fence.

In an embodiment, the apparatus 100 may include only the latch members 106*a* and 106*b*. In such embodiment, the apparatus 100 may only have the lower lips 110*a* and 110*b* and the locking tabs 116*a*-116*d* (116*e*-116 *h* are not shown and are on opposite side) that may extend from the lower lips 110*a* and 110*b*. Also, in such embodiment, the latch members 106*a* and 106*b* and the lower lips 110*a* and 110*b* may be extending from opposite side plates (for example, the side plates 104*a* and 104*b*). In a preferred embodiment, the apparatus 100 includes the lower lips 110, and each lower lip includes at least one corresponding locking tab 116 extending from a distal edge thereof. More easily seen in FIGS. 3 and 4, are the eight locking tabs 116*a*-116*h*, and the four latch members 106 (*a*-*d*).

Figure 4:
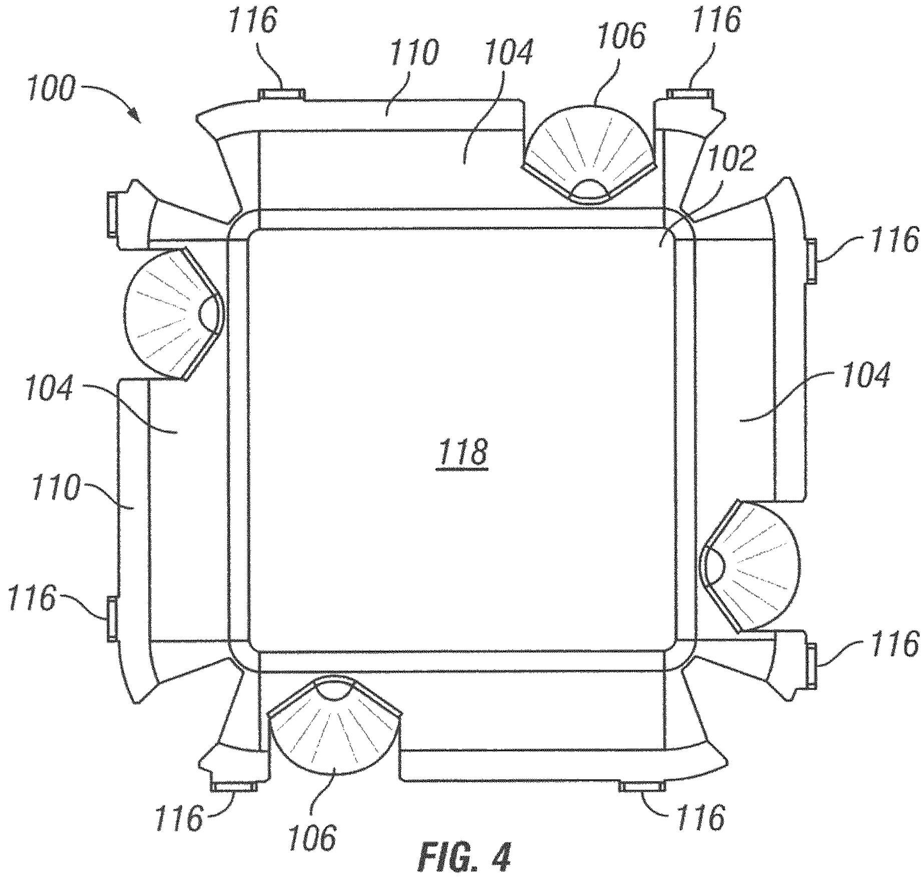
FIG. 4 shows a bottom view of the apparatus of FIG. 1, in accordance with an embodiment of the present invention.

The base plate 102 has a rectangular structure and has the upper surface 112 and the lower surface 118 (shown in FIG. 4). While both surfaces 112 and 118 form the desired design or text, generally it is the upper surface 112 which remains visible to form a desired pattern so as to represent corresponding text and designs to onlookers. In some embodiments, the upper surface 112, as well as the bottom surface 118 if desired, of the base plate 102 may have a light reflective surface disposed thereon and may reflect light to attract attention and also to make the represented text and design. Optionally, the light reflective surface may also be disposed on other portions of the apparatus 100. In and embodiment, the base plate 102 may have a lighting arrangement (for example, a light emitting diode) that may be powered by battery, photo voltaic, or solar power. In such embodiments, the base plate 102 (referred interchangeably with the term "the base 102") may have at least one hole that may be adapted in size to receive an electrically powered light bulb or other light means. The lighting arrangement in the display plate 102 may glow in suitable lighting conditions to make the represented text and designs visible as well as aesthetically appeasing. In an embodiment, the lighting arrangement may include a light strip that may be placed along or near (for example directly below) the first and second lower lips 110*a* and 110*b* of the apparatus 100 and powered by the same means as electrically powered light bulb in the display plate 102. In such embodiments, the light strip may run along the lower lips 110. In some embodiments, the lighting arrangement may include one or more lights positioned at different points on the lower lips 110. The light strip and the one or more lights may be glued onto the apparatus 100 by way of an adhesive, or secured in any suitable fashion.

Figure 2:
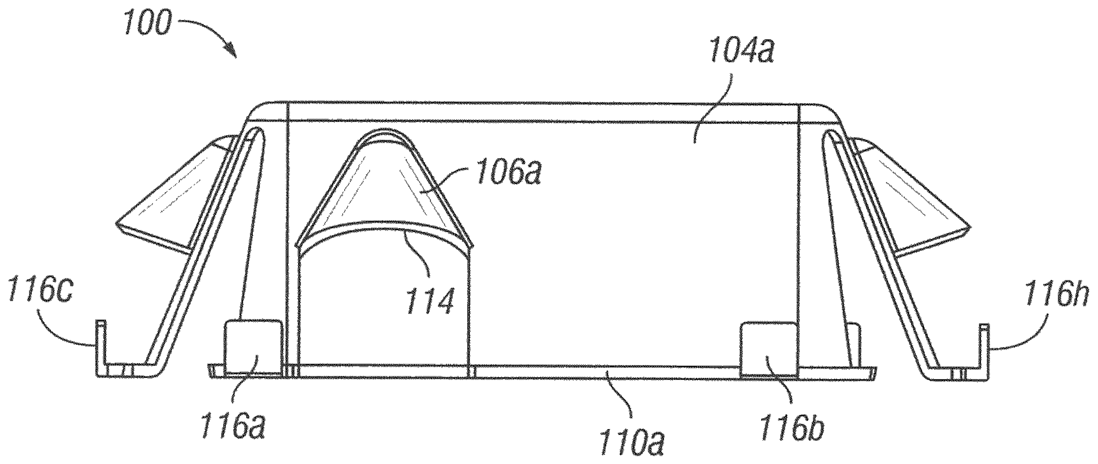
FIG. 2 shows a side elevation view of the apparatus of FIG. 1, in accordance with an embodiment of the present invention.

As is seen in FIG. 2, each latch member 106 protrudes outwardly in a ramp fashion from each corresponding side plate 104. Each latch member 106 is preferably flush with each corresponding side plate 104 and terminates with a bottom flange surface 114 that is separated from the lower lips 110 by a selected distance. This ramp configuration of latch members 106 and the clearance between flange surface 114 and the upper surface of lip member 110 allows the apparatus 100 to be releasably secured to a fence.

Figure 3:
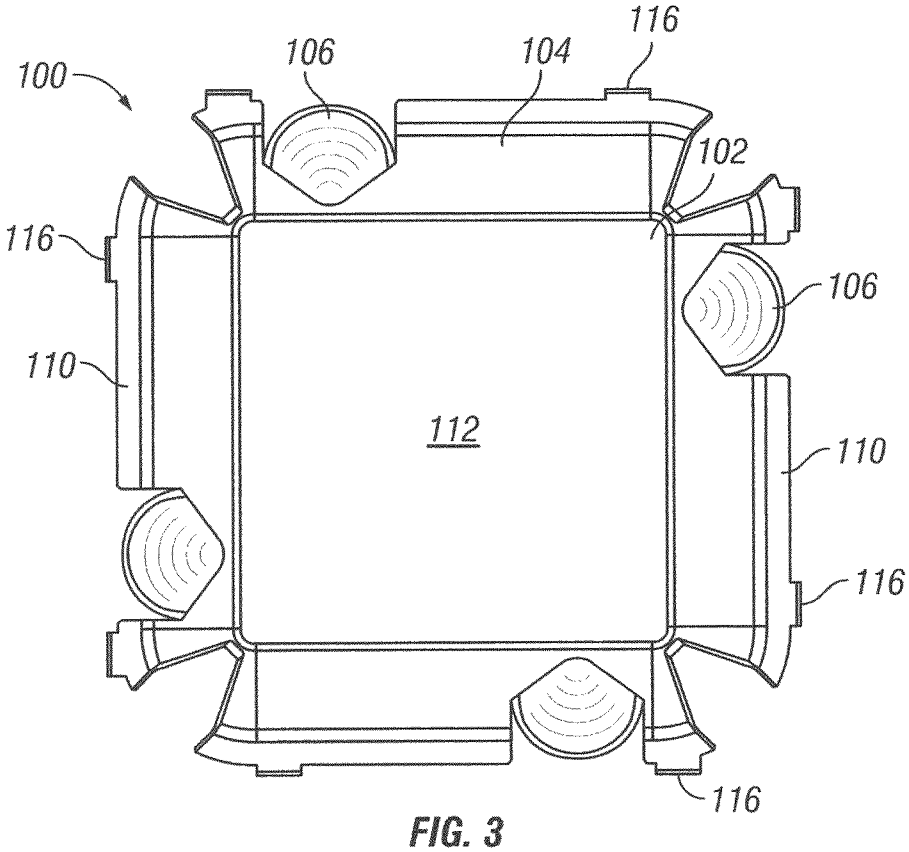
FIG. 3 shows a top plan view of the apparatus of FIG. 1, in accordance with an embodiment of the present invention.

As seen in FIG. 3, the side plates 104 extend at an angle that is greater than 90 degrees from the display plate 102. The side plates 104 form an obtuse angle with the base plate 102. The apparatus 100 further includes a slot 108 between adjacent side plates (for example, between the side plates 104*a* and 104*c*, 104*b* and 104*d*, 104*a* and 104*d*, and 104*c* and 104*b*). Such slots allow bending of the side plates 104 when being inserted in the fence hole of the chain-link fence. In other words, adjacent side plates (for example, 104*a* and 104*c*, 104*b* and 104*d*, 104*a* and 104*d*, and 104*c* and 104*b*) have V-shaped cutouts therebetween. Such cutout between side plates 104 ensures an optimal flexibility of the apparatus 100 that allows the apparatus 100 to be easy to handle while being inserted in or taken out of the fence hole of the chain-link fence. Further, once the cups are installed in the fence hole, the cutouts act as wind-throughs to allow wind to flow through the cutouts.

The side plates 104 include the latch members 106 that protrude therefrom and extend in a direction that moves away from a center of the display plate 102. Each latch member 106 has a rounded cross-section. It should be understood that latch members 106 and locking tabs 116, on adjacent side plates 104 may be offset somewhat to accommodate interweaving of the wires in the chain-link fence. The width or gauge of the wire will also impact the dimensions of the locking tabs 116. The locking tabs 116 are to be of sufficient size to fit over the wire employed on the fencing.

Each latch member 106 is preferably flush with the corresponding side plate 104 at a position near the upper surface 112 of the base plate 102, and is positioned in a way that a distance between the latch members 106 and the corresponding lower lips 110 is greater than or equal to a diameter of the fence hole of the chain-link fence. Such distance allows the chain-links to fit into a clearance between the latch members 106 and the lower lips 110.

Further, the lower lips 110 extend from the distal ends of the side plates 104 in a plane substantially parallel to the display plate 102 and in the direction away from the base plate 102. The lower lips 110 are configured to rest onto the wires corresponding to edges of the fence hole of the chain-link fence when the apparatus 100 is inserted into the fence hole of the chain-link fence. The lower lips 110 may have an upward curved shape that restricts slipping of the wires when the apparatus 100 is being inserted in the fence hole. The lower lips 110 restrict the movement of the apparatus 100 when the wires of the fence hole of the chain-link fence are positioned between the latch members 106 and the lower lips 110. Hence, the wires of the fence hole get sandwiched and locked between the latch members 106 and the lower lips 110. The lip 110 is actually all around the cup 100 on all sections of the peripheral surface.

The plurality of locking tabs 116*a*-116*h* extend from the distal edges of the lower lips 110 of the side plates 104. The locking tabs 116 extend perpendicular to the lower lips 110 and extend in a direction towards the center of the base plate 102. The locking tabs 116 form a C-shaped structure along with the corresponding lower lips 110 and the side plates 104. Each locking tab 116 is configured to snap onto a wire corresponding to an edge of the at least one square fence hole of the chain-link fence when the apparatus 100 is inserted into the fence hole of the chain-link fence. The C-shaped structure of the locking tabs 116, the lower lips 110, and the side plates 104 allows the locking tabs 116 to snuggly hold the wire corresponding to an edge of the fence hole of the chain-link fence. Also, the locking tabs 116 and the side plates 104 cause the wires of the fence hole to get sandwiched therebetween. In an embodiment, distance between the locking tabs 116 and the side plates 104 is less than or equal to the diameter of the wire that correspond to the edges of the fence hole. The locking tabs 116 may be attached to the wires in a snap-fit manner such that the apparatus 100 is gripped to the fence hole of the chain-link fence. Hence, a horizontal force from any direction causes the wires to nudge into the side plates 104 and the locking tabs 116, thereby restricting movement of the apparatus 100 and preventing the apparatus 100 from easily falling out of the fence.

The locking tabs 116 restrict movement of the apparatus 100 once the cup 100 is secured in the fence hole. The locking tabs 116 do not allow the apparatus 100 to move horizontally as it binds or secures the apparatus 100 to the wires of the fence hole by engaging or locking the wires between the side plates 104, the lower lips 110 and the locking tabs 116. Hence, the locking tabs 116 restrict a horizontal movement of the apparatus 100 due to a force being applied thereon that is not intended to safely remove the apparatus 100 from the fence hole. Notably, to safely remove the apparatus 100 (also referred to as "cup 100") from the fence hole, the apparatus has to be physically bent inward and then pulled or pushed out from the fence hole. The locking tabs 116 may have dimensions that allow the apparatus 100 to hold onto the wires of the fence without the apparatus 100 being pushed through the fence hole of the chain-link fence.

Illustrated in FIG. 7A-E, to place the cup 100 in the fence holes, a user will grip the cup 100 between their thumb and fore or middle finger, and while squeezing slightly the cup 100, insert the cup 100 into the fence hole such that the lower lips 110 and locking tab 116 are engaged with the wire of the fence hole (i.e., an opening of the fence). Generally, there are at least two (2) locking tabs 116 per side plates of the cup 100. These locking tabs 116 are not the entire length of the side plate 104 to allow for a second cup adjacent to have space for snapping or locking in place on the fence hole. Upon engagement, depress the cup 100 to secure in place. To remove the cup 100, grip the edges of the cup 100, bend inward, and remove the cup 100 from the fence hole.

In an embodiment, the apparatus 100 or cups may be injection molded with a polymer containing the UV stabilizers, and thus avoid coating the cup 100. It may be apparent to a person of ordinary skill in the art that in some embodiments, the apparatus 100 may include additional or fewer latch or other protrusions than as shown in FIGS. 1-4 without departing from the scope of the disclosure. For the sake of brevity, the apparatus 100 shown in FIG. 1 is described to have dimensions that are in conformity with a single fence hole of the chain-link fence. The dimensions of the cups are approximately 2¾"×2¾ " from lip (110*a*) to lip (110*b*). The cup is approximately 1" deep, and the base plate (102) is approximately 1¾"×1¾" in size. The figures and description herein depicted in use is with the most common type of chain link fence, which generally has square-like fence holes of approximately 2½"×2½" in size.

Referring to FIG. 2, shown is the first side plate 104*a*. The first side plate 104*a* has the first latch member 106*a* extending therefrom. The first side plate 104*a* has the first lip 110*a* at the distal end thereof. The apparatus 100 includes a first locking tab 116*a* and a second locking tab 116*b* that extend from a distal edge of the first lip 110*a*. As shown in FIG. 2, the first and second locking tabs 116*a* and 116*b* are positioned on either side of the first latch member 106*a*. Also, the second, third, and fourth side plates 104*b*, 104*c*, and 104*d* have similar arrangement of locking tabs to that of the first side plate 104*a*. The locking tabs 116 are evenly distributed throughout the four side plates 104, thereby restricting an unwanted movement of the apparatus 100 from any direction. It will be apparent to a person of ordinary skill in the art that the arrangement of the locking tabs 116 and the side plates 104 shown herein is exemplary and may vary with respect to dimensions of the apparatus 100. As mentioned above, the locking tabs 116 may vary in width across the side plates 104 as desired by the user, provided there is some space for overlap with the adjacent cup when locked in place on the fence hole. Exemplary dimensions of the locking tabs 116 include ¼ "wide×⅛" long. The length can vary if a user has a particular size fence wire they wish to engage with. However, ⅛" has been found to fit most needs. The ¼" length can vary if a user desires to have a longer locking tab secured onto the fence wire. The locking tabs 116 can vary in dimension from about ¼" to about ½" on any side plate, and up to all four side plates of the cup 100. Should longer tabs be desired, it is recommended they be on two opposing side plates 104. The locking tabs (116*a*) found on the corners of the cup 100 (116*a*) may only be about ¼" by about ⅛" in dimension, or as desired for fit based on fence gauge and fence hole size. Also shown in FIG. 2 is the flange 114 or top section of the latch 106.

FIG. 3 shows a top view of the apparatus 100 of FIG. 1, in accordance with an embodiment of the present invention. Referring to FIG. 3, shown is the upper surface 112 of the base plate 102 and the lower lips 110 at the distal ends of the corresponding side plates 104. Due to the angled side plates of the cup, the surface area of the upper surface 112 is less than an area enclosed within the lower lips 110 of the side plates 104. Hence, the area enclosed within the apparatus 100 increases moving from the base plate 102 to the lower lips 110.

FIG. 4 shows a bottom view of the apparatus 100 of FIG. 1, in accordance with an embodiment of the present invention. Referring to FIG. 4, the lower surface 118 of the base plate 102 is visible herein. Reflective coatings or stickers of some type, as desired by users, may be placed on surfaces 112 and or 118 to enhance the look of the final fence design.

The apparatus 100 of the present invention may be provided in different sizes to fit different types of chain-link fences. Chain-link fences come in four standard sizes, including: 134", 2", ⅔4" and ⅔4". A 134" chain-link fence is typically the size of a fence utilized in tennis court fencing.

In an embodiment, the apparatus 100 may have a size that is in proportion with a single fence hole of a chain-link fence. In such embodiments, one cup or apparatus 100 is installed in a fence hole of the chain-link fence.

In an alternate embodiment, the apparatus 100 may have a size that allows multiple units of the apparatus 100 to be installed in a single fence hole of the chain-link fence. In such embodiment, a single cup 100 may be coupled to one or more cups 100 and may be, collectively, installed in a single fence hole of the chain-link fence.

In another alternate embodiment, the apparatus 100 may have a size that is in proportion with a plurality of fence holes of the chain-link fence, or that the fence has holes of varying sizes. In such embodiment, the apparatus 100 would be of varying sizes to match the varying fence hole sizes, and upon installation, be coupled and/or locked with the plurality of fence holes of the chain-link fence.

Figure 5:
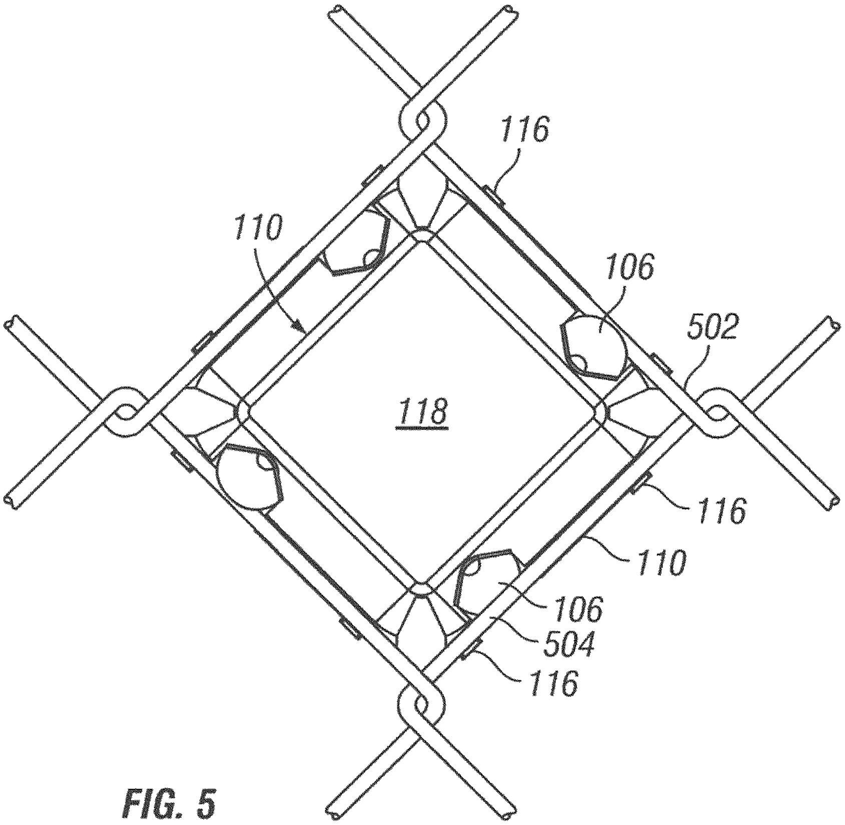
FIG. 5 is a view of the top of the apparatus of FIG. 1 installed in a fence hole of a chain-link fence, in accordance with an embodiment of the present invention.
Figure 6:
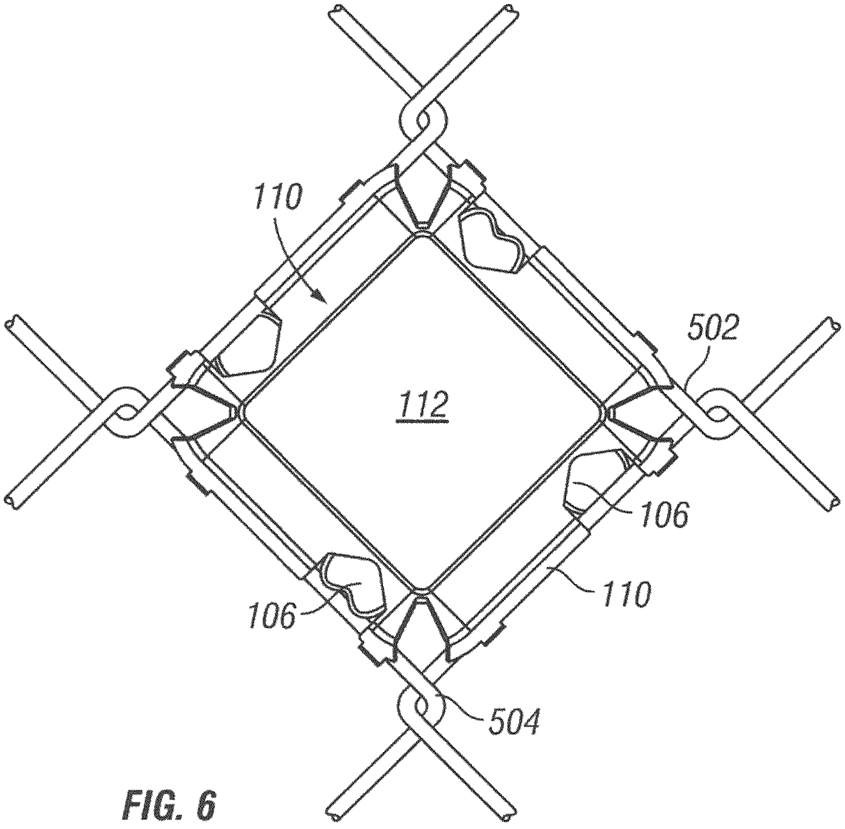
FIG. 6 is a view of the bottom side of the apparatus of FIG. 5 installed in the fence hole of the chain-link fence, in accordance with an embodiment of the present invention.

Referring now to FIGS. 5 and 6 in the drawing, the apparatus 100 is shown installed in the fence hole 502 of the chain-link fence 504. For the sake of brevity, the chain-link fence 504 is considered to be a conventional interwoven chain link fence. However, it should be understood that the apparatus 100 may be used on a wide variety of fence types, such as wire, construction, stockade, picket, slatted, and other types of fences. The improved invention may be utilized in any type of fence which is formed, at least in part by wire strands forming the fence holes. Shapes such as square, diamond (essentially a square turned on its side), octagonal, rectangular, and the like may be employed. While chain link fences are common in residential and commercial establishments, other type of wire fences, wherein the improved invention could be used include with chicken wire used for chicken or poultry coops, game fence (typically used at a ranch to keep out or confine wild game such as deer, elk, javalina, etc.), or field fences also used at farms or ranches but being of stronger mesh than traditional game fences. Chicken coop wire is generally about 1"-2" hexagon or octagon mesh wire, while field fences can range up to 4"×4" mesh wire. The cup 100 can be built to the size desired by the user fitting up to 4" or even 6" plus size mesh fence holes, intended to keep out larger livestock or animals. Depending on the size needed, the improved locking tab (116) will be built according to the wire's diameter, thickness, or also termed wire gauge. Gauge is the measurement of thickness of wire. The cups can be made of varying sizes and dimensions with the side plates, lower lips, and locking tabs built according to needs based on fence hole.

As shown in FIG. 5, the apparatus 100 is dimensioned such that upper surface 112 of the base plate 102 fits through the fence hole 502 of the chain-link fence 504, but the lower lips 110 do not fit through the fence hole 502. The upper surface 112 remains visible to the onlookers from the front side of the apparatus 100. In the method of the present invention, the apparatus 100 is inserted through the fence hole 502 of the chain-link fence 504, such that the wires of the chain-link fence 504 slide along the ramp portions of the latch members 106 until the wires snap into a space and are sandwiched between the flange surfaces 114 and the lower lips 110. The locking tabs 116 also snap onto the wires and hence sandwiches the wires between the side plates 104 and the locking tabs 116. Thus, the apparatus 100 is preferably capable of flexing inwardly upon itself to allow the apparatus 100 to be snapped into place within the fence hole 502 of the chain-link fence wires 504. It should be understood that the latch members 106 on adjacent side plates may be offset by a distance to accommodate interweaving of the wires of the chain-link fence 504. In cases where the latch members 106 are not offset on adjacent side plates, only the latch members 106 on opposing side plates will fully sandwich the wires between the flange surfaces 114 and the lower lips 110. In such cases, the wires on other two side plates 104 will only be in pressing contact with the ramp portions of the corresponding latch members 106.

Further, when the wires are sandwiched between the flange surfaces 114 and the lower lips 110, the wires remain all-round secured by way of the locking tabs 116 positioned around or engaged with, the sandwiched wires. Therefore, when the apparatus 100 is pushed or pulled from the display plate 102, the latch members 106, the lower lips 110, and the locking tabs 116 restrict unwanted movement of the apparatus 100. When the apparatus 100 is pushed or pulled from the side plates 114, locking tabs 116 restrict the unwanted movement of the apparatus 100. Therefore, the apparatus 100 remains secured within the fence hole 502 and serves its purpose for as long as required without falling off due to wind, or interference from children, animals, or the like.

In a chain-link fence, each opening is defined by four wire strands. Two of the wire strands are in one plane, while the other two wire strands are in another (slightly offset) plane. Accordingly, only two latch members 106 will engage two wire strands in a single plane. The other two latch members will not engage the wire strands.

As shown in FIG. 6, the wires of the chain-link fence 504 is visible only at the latch members 106 as the lower lips 110 is not extending from corresponding side plates 104 at the corresponding latch members 106. Hence, remaining portion of the wires that do not coincide with the latch members 106 remain hidden by the lower lips 110. Note in FIG. 5, the wires 504 are visible to onlookers.

It will be apparent to a person of ordinary skill in the art that FIGS. 5 and 6 are exemplary and do not limit the scope of the disclosure. In an embodiment, the apparatus 100 may be associated with multiple fence holes of the chain-link fence. In another embodiment, the apparatus 100 and the fence hole 502 may have a shape that is different from that shown in FIGS. 5 and 6.

Figure 7A:
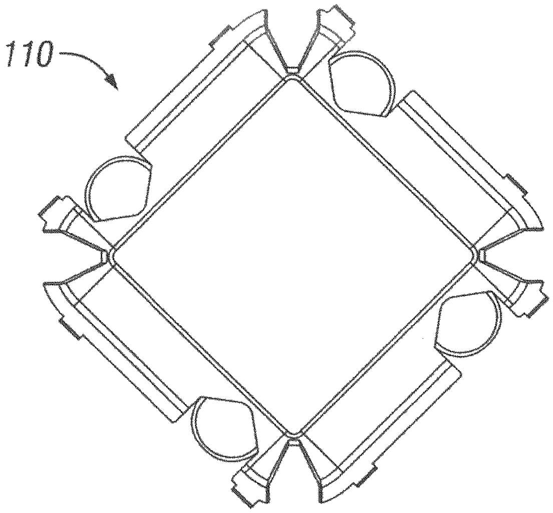
FIGS. 7A-7E show a sequence of actions for installing the apparatus of FIG. 1 in the fence hole, in accordance with an embodiment of the present invention.
Figure 7B:
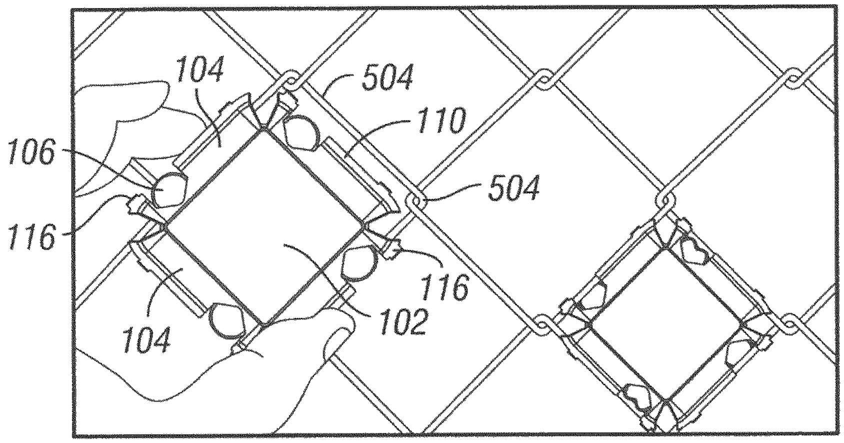
Figure 7C:
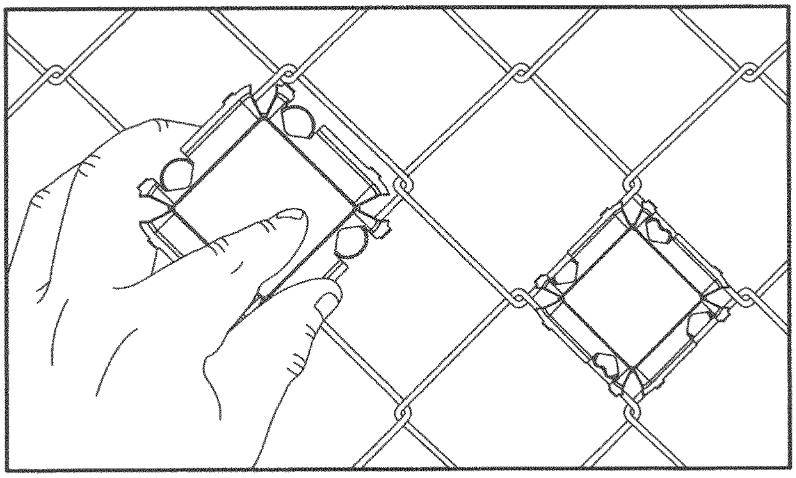
Figure 7D:
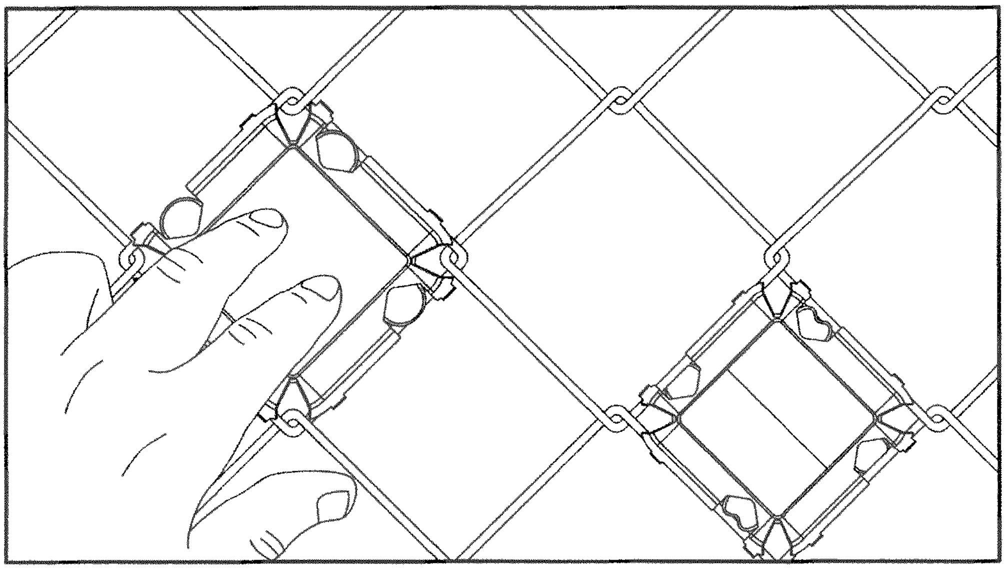
Figure 7E:
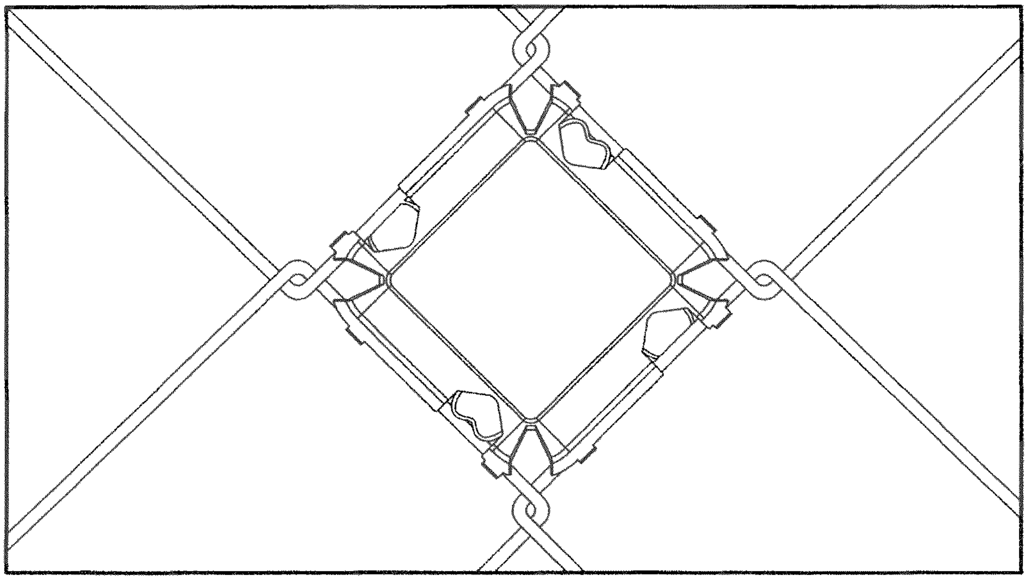

FIGS. 7A-7E illustrate how the cups are placed and locked into position in a fence hole. FIG. 7A depicts the apparatus 100 prior to installation. FIG. 7B depicts a first step for installing the apparatus 100. At the first step, a user grips the apparatus 100 between their thumb and fore or middle finger. FIG. 7C depicts a second step which includes the user squeezing two opposite side plates of the cup together. The side plates 104 of the cup are sufficiently flexible, and hence can be bent due to the gripping of the apparatus 100 by the installer. The installer then inserts the apparatus 100 into the fence hole 502 of the chain-link fence. The side plates 104 apply a bias against the wires of the fence, and the wires engage the latch members 106 in an interference fit until the wires clear the latch members 106 and the cup snaps into a secure position between the latch members 106, the lower lips 110, and the locking tabs 116. FIG. 7D shows the final step where the installer presses the middle of the lower surface 118 of the apparatus 100 to engage the locking tabs 116, and snap the wires between the locking tabs 116 and the side plates 104 i.e., to snap the apparatus 100 into place. Snapping is accomplished when the latch members 106 of the apparatus 100 are urged around the wire mesh components and the locking tabs 116 sandwich the wire mesh components with respect to the side plates 104. The latch members 106 will secure the insert (i.e., the apparatus 100) by gripping the wire mesh component on one side, while the lower lips 110 and locking tabs 116 of the apparatus 100 grip the other side of the wire mesh component. FIG. 7E, depicts the installer ensuring a snug fit by making sure that the top-left and bottom right latch members 106 and locking tabs 116 are securely fastened to the chain-link fence 504.

Figure 8A:
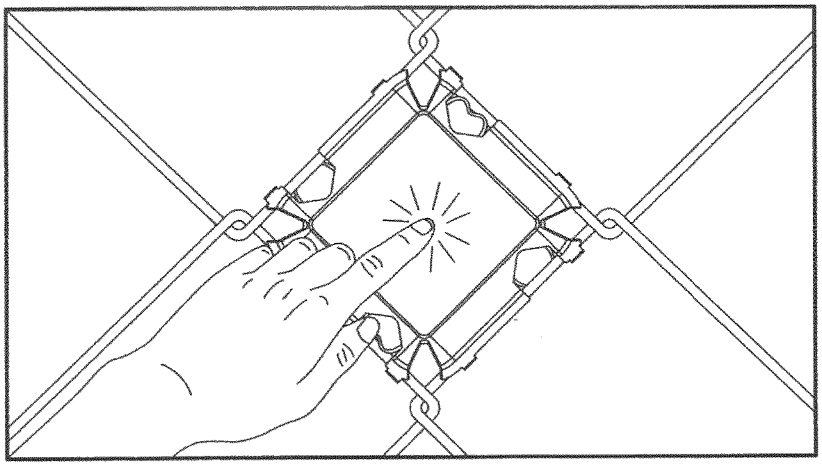
FIGS. 8A and 8B show an operation of the apparatus of FIG. 1 to restrict undesirable movement thereof when an intruder attempts to push the apparatus out of the fence hole.
Figure 8B:
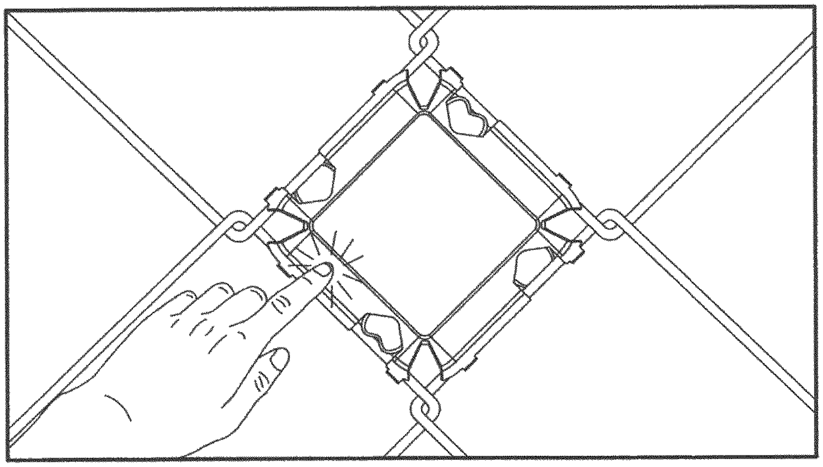

FIGS. 8A and 8B show an operation of the apparatus 100 to restrict an undesirable movement thereof when an intruder attempts to push the apparatus 100 out of the fence hole 502 of the chain-link fence. FIG. 8A depicts a hand of an intruder that intends to push the apparatus 100 out of the fence hole 502. The intruder is shown to push the apparatus 100 at the base plate 102. This movement of the apparatus 100 gets restricted by the flange surfaces 114 of the latch members 106, the lower lips 110, and the locking tabs 116. Hence, the apparatus 100 remains secured within the fence hole 502.

Referring now FIG. 8B, shown is the intruder pushing the apparatus 100 at one of the side plates 104. When pushed at one of the side plates 104, the chain-link 504 comes in contact with the locking tabs 116 at the side plate that is being pushed. Also, the chain-link 504 comes in contact with an opposite side plate and the corresponding locking tabs 116. Therefore, movement of the chain-link 504 gets restricted by the locking tabs 116 and the side plates 104. Hence, the apparatus 100 remains secured within the fence hole 502. It will be appreciated that an identical sequence of operations may be repeated at every instance when the apparatus 100 is pushed at any of the side plates 104.

In an embodiment, the intruder may pull the apparatus 100 from a side plate. For removal of the cup 100, a user or intruder will do the opposite of that explained with FIG. 7. The wires may come in contact with the side plate from which the apparatus 100 is being pulled. The chain-link 504 also comes in contact with the locking tabs 116 at an opposite side plate of the side plate from which the apparatus 100 is being pulled. Therefore, any movement of the wires gets restricted by the side plate being pulled and the locking tabs 116 on the opposite side plate. Hence, the apparatus 100 remains secured within the fence hole 502. Beneficially, such restriction of unwanted movement of the apparatus 100 prevents the apparatus 100 from falling out of the fence hole 502 whenever a force is applied from any side to dislocate the apparatus 100 from its position. For removal, an active effort of bending the cup 100 and disengaging the locking tabs 116 from the fence wire is needed.

The apparatus 100 when inserted in the hole 502 has been shown to withstand vigorous wind forces (for example, wind blowing at a speed of up to 100-150 miles per hour). The apparatus 100 has also been shown to withstand natural disasters such as tornados, hurricanes, cyclones, storms, and the like. The locking tabs 116 of the apparatus 100 locks onto the chain-link fence 504 and can resist winds or forces in any direction to hold the apparatus 100 within the chain-link fence 504.

Figure 9:
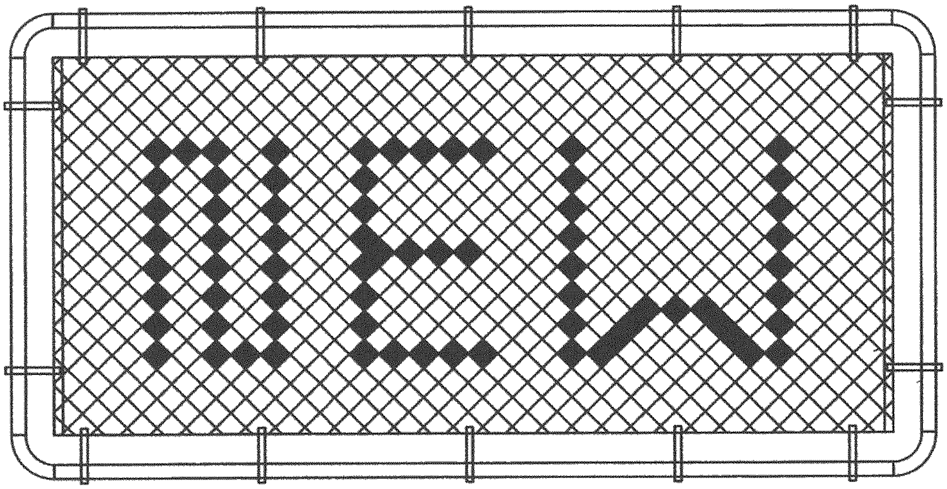
FIG. 9 shows an example of an application of a plurality of apparatus, in accordance with an embodiment of the present invention.

FIG. 9 depicts an implementation of the present invention which generates a word "NEW'. An exemplary apparatus color here is assumed to be red, and has been shown to be easily visible to passing motorists. The darker colors attract onlookers and are visible from far off as well as close to the fencing. Hence, the shown invention is economical, durable, efficient, and effective.

The cups can also act as sound barriers once placed on the fencing to dampen noises coming from within or outside the fenced area, and can also provide a higher level of privacy than a typical chain link fence without the cups present. A decrease of up to 10% in sound has been shown to exist with a fence covered in the inventive cups. Decrease in sound of about 2% to about 20% with a preference in decrease of about 5% to about 10% has been observed with the use of the inventive cups once placed on a fence. It is believed that greater than 20% can be achieved in sound reduction depending upon the size of the fence, area enclosed and decibel level of the sound together with the fence covered in the inventive cups. Also, the cups can be used to block undesirable or distracting view/scenery present in a vicinity of the chain-link fence.

Figure 10:
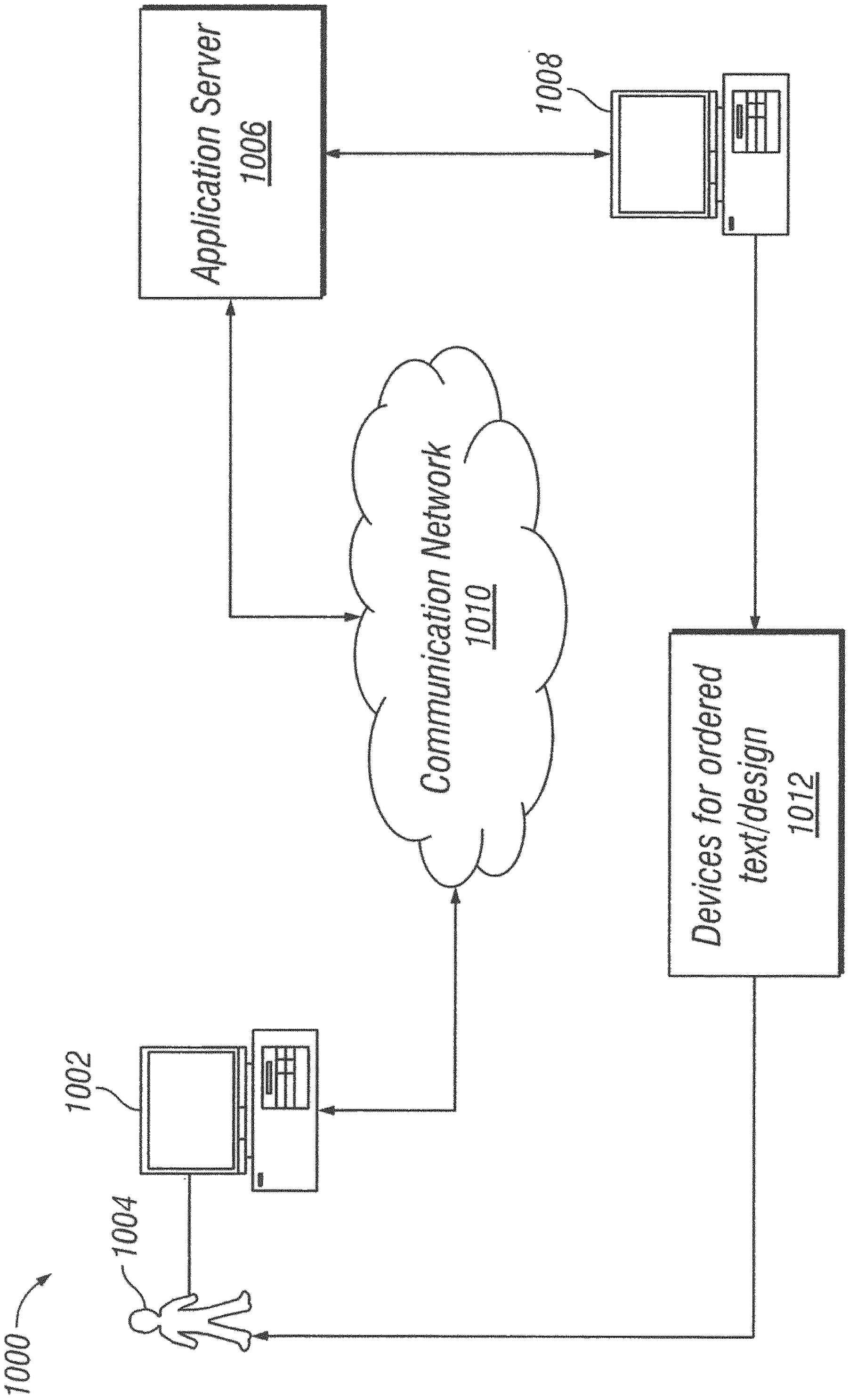
FIG. 10 shows a schematic diagram of a system environment for generating purchase orders and providing layout instructions and graphics, in accordance with an embodiment of the present disclosure.
Figure 11A:
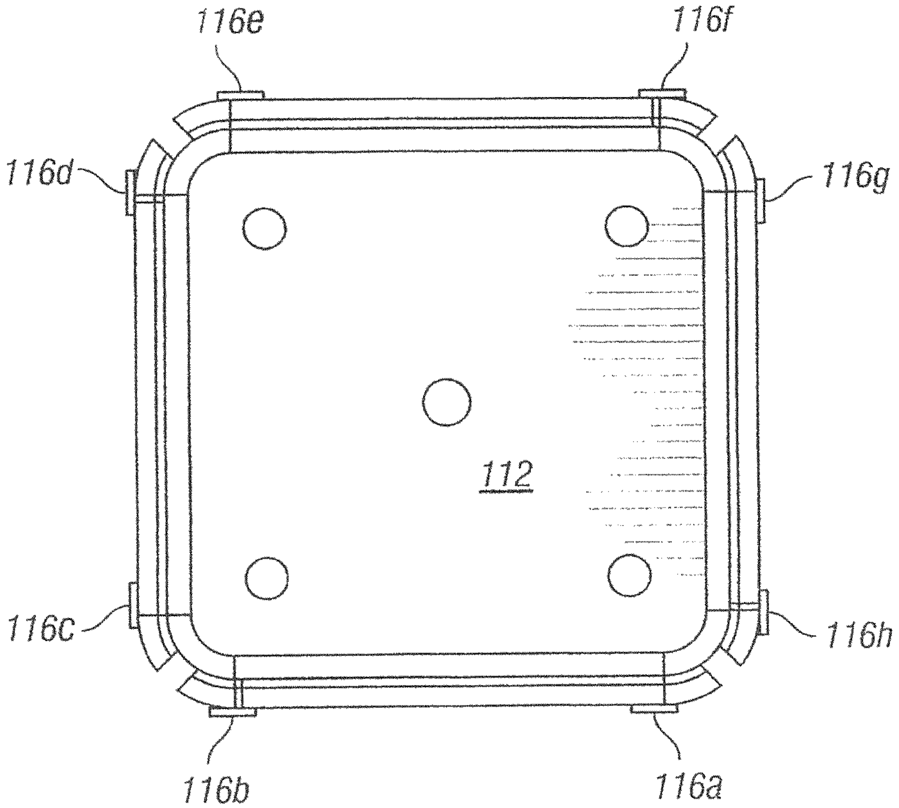
FIG. 11A shows a top view of an alternate embodiment wherein the apparatus has a square like shape and inserts for lighting element(s)
Figure 11B:
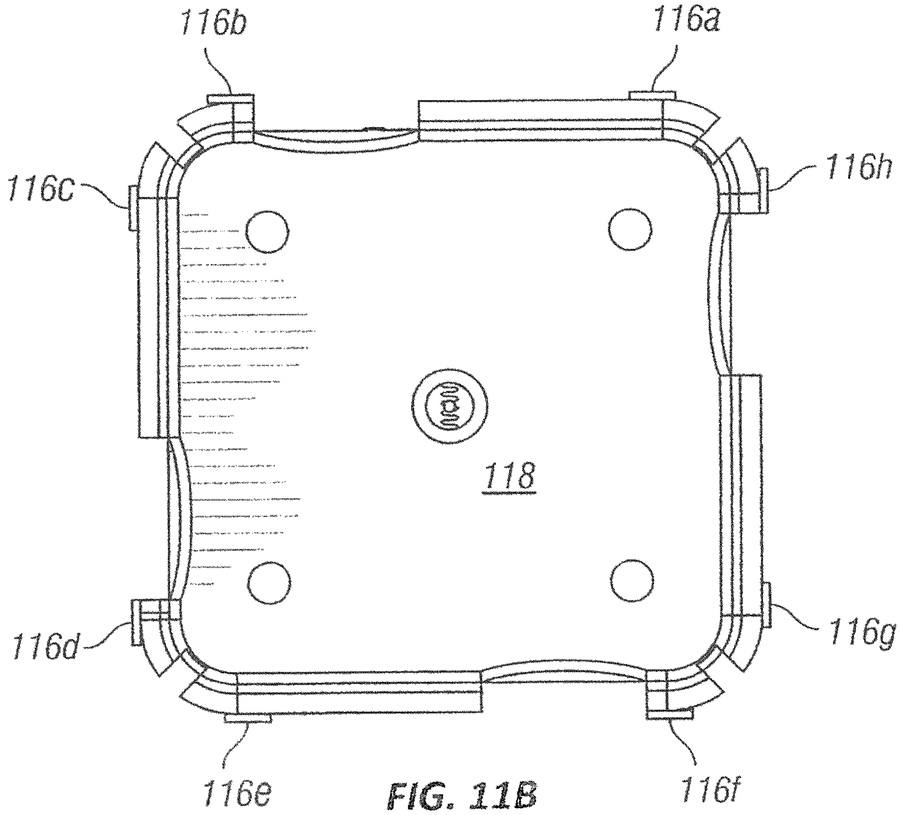
FIG. 11B shows a bottom view of FIG. 11A with a lighting element inserted in the hole.

FIG. 10 shows a schematic diagram of a system environment for generating purchase orders for the cups 100 and providing layout instructions and graphics, in accordance with an embodiment of the present disclosure. Referring to FIG. 10, shown is the system environment 1000 that includes a user apparatus 1002 associated with a user 1004, an application server 1006, a system apparatus 1008, and a communication network 1010. The user 1004 may have the chain-link fence having a height H and length L, with the chain-link fence having a size S. The user 1004 may desire to place an advertisement on the chain-link fence. The user apparatus 1002 may be used by the user 1004 to place a purchase order for a count of apparatus 100 and colors thereof that may be required for placing the advertisement on the chain-link fence. The user apparatus 1002 may be a laptop, a computer, a cell phone, or the like that may be associated with the communication network 1010 and may communicate with the application server 1006 to place the purchase order for the count of apparatus 100 and colors thereof. U.S. Pat. No. 9,069,433 discloses the method of generating a purchase order in detail. The application server 1006 may be a cloud-based server that may receive parameters associated with the purchase order and may compute dimensions of the apparatus required, a count of the apparatus with specific dimensions, a color associated with each apparatus. The application server 1006 may further communicate the computed information to the system apparatus 1008. The system apparatus 1008 may be used by a manufacturer of the apparatus 100. Based on the received purchase order, the apparatus required for creating text or design on the chain-link fence may be manufactured. Subsequently, at 1012, the purchase order is fulfilled by the manufacturer by dispatching the manufactured apparatus to the user 1004.

In an embodiment, the apparatus required for creating the pattern desired by the user 1004 may be assigned corresponding identifiers to indicate a position thereof on the chain-link fence. Each apparatus may be inserted in at least one fence hole of the chain-link fence based on the identifier associated therewith to create the required pattern. Notably, the apparatus may be assigned the identifiers in such a way that locking tabs of adjacent apparatus do not come in contact with each other.

In an embodiment, the application server 1006 may communicate parameters associated with the received purchase order to the system apparatus 1008. The system apparatus 1008 may host a layout software that operates upon the parameters provided by the user 1004 in order to generate the purchase order and a set of instructions which may include a graphic (text/design) which "maps" a position of each apparatus on the chain-link fence in order to facilitate installation to generate the pattern associated with the text/design.

The embodiments of the present invention offer numerous advantages. The disclosed apparatus 100 may be inserted and locked in place in one or more fence holes of the chain-link fence to create various textual or design patterns. The disclosed apparatus 100 is an integral piece which includes locking tabs that lock the apparatus 100 with at least one fence hole of the chain-link fence and hence prevent the apparatus 100 from falling out due to wind, animals, intruders, or the like. Further, securing the apparatus 100 to the chain-link fence prevents the textual or design patterns from getting damaged and prevent littering caused due to the apparatus 100 falling out from the fence hole. Therefore, the disclosed apparatus is user friendly as well as environmentally friendly. Also, installation of the present invention does not require any specialized skill-set or tools, and hence may be installed by a single user in a relative short time span. The invention fits securely onto a fence hole, is economic, effective, robust, and an efficient solution for placing signs, symbols, design, advertisement, or the like on chain or wire link fences. Further, the disclosed apparatus is cost-effective and durable and hence is preferable over hoardings and billboards.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claim.

The present invention has been described herein with reference to a particular embodiment for a particular application. Although selected embodiments have been illustrated and described in detail, it may be understood that various substitutions and alterations are possible. Those having an ordinary skill in the art and access to the present teachings may recognize additional various substitutions and alterations are also possible without departing from the spirit and scope of the present invention.

What is claimed is:

1. In combination, a chain link fence having generally square openings and a device for insertion in said generally square opening comprising:

a. a generally square planar base having four edges;

b. four sidewalls each connected to a base edge, wherein an angle between the base and each of the sidewalls is greater than 90 degrees, whereby the base and sidewalls have a shape generally that of a truncated pyramid;

c. wherein the base has a size less than the size of the fence openings, and the four sidewalls have distal edges which define a square having a size greater than the fence opening, d. a lip connected to each sidewall distal edge and approximately parallel to the base, wherein each lip extends away from the base; the improvement comprising at least one locking tab extending from at least two lips opposite each other on the device in a plane substantially perpendicular to the planar base, wherein each locking tab is configured to securely engage with the a wire of the chain-link fence when the device is inserted into the fence opening and further wherein once installed on a chain link fence opening, the device withstands winds of greater than 100 mph.

2. The device of claim 1 wherein the locking tab forms a C-shaped structure with the sidewall.

3. The device of claim 2 wherein the C-shaped structure is engaged with the corresponding wires of the chain link fence opening in a zero gap.

4. The device of claim 1, wherein said device is capable of withstanding winds greater than 150 mph.

5. The device of claim 1 wherein the device is an integral unit and the sidewalls are flexible, and wherein further the side plates apply a bias against the chain-link fence when the device is inserted into the fence opening.

6. The device of claim 1 further comprising a slot between each pair of adjacent side plates.

7. The combination of claim 1, wherein, during insertion of the device in the fence openings, the wire engages latch members integral with the device in an interference fit until the wire clears the latch members and snaps into a secure position.

8. The device of claim 1 further comprising at least one hole in the planar base adapted in size and shape to receive an light bulb.

9. The device of claim 1 further comprising a light reflective surface disposed on at least one surface of the planar base.

10. The device of claim 1 wherein the devise is inserted into one of the fence openings allowing at least a portion of the sidewalls to be in contact with the wires of the chain link fence.

* * * * *